United States Patent
Winkelmann et al.

(10) Patent No.: US 10,479,480 B2
(45) Date of Patent: Nov. 19, 2019

(54) FOLDABLE WING FOR AN AIRCRAFT AND AIRCRAFT HAVING A FOLDABLE WING

(71) Applicant: Airbus Operations GmbH, Hamburg (DE)

(72) Inventors: Christoph Winkelmann, Hamburg (DE); Wilfried Ellmers, Hamburg (DE); Jan Haserodt, Hamburg (DE); Rico Weber, Renchen (DE); Ivan Petrov Ivanov, Hamburg (DE)

(73) Assignee: Airbus Operations GmbH (DE)

( * ) Notice: Subject to any disclaimer, the term of this patent is extended or adjusted under 35 U.S.C. 154(b) by 355 days.

(21) Appl. No.: 15/353,098

(22) Filed: Nov. 16, 2016

(65) Prior Publication Data
US 2017/0137112 A1    May 18, 2017

(30) Foreign Application Priority Data
Nov. 18, 2015    (EP) .................................... 15195101

(51) Int. Cl.
*B64C 3/56*    (2006.01)

(52) U.S. Cl.
CPC ...................... *B64C 3/56* (2013.01)

(58) Field of Classification Search
CPC ........ B64C 3/56; B64C 2201/102; B64C 3/54
USPC .......................................................... 244/49
See application file for complete search history.

(56) References Cited

U.S. PATENT DOCUMENTS

| 2,289,224 | A | * | 7/1942 | Anderson | B64C 3/56 244/49 |
|---|---|---|---|---|---|
| 6,260,799 | B1 | * | 7/2001 | Russ | B64C 3/56 244/49 |
| 7,014,141 | B2 | * | 3/2006 | Cox | B64C 39/024 244/117 R |
| 8,387,913 | B2 | * | 3/2013 | Karem | B64C 3/56 244/102 SL |

(Continued)

FOREIGN PATENT DOCUMENTS

| GB | 635 259 A | 4/1950 | |
| GB | 635259 A | * 4/1950 | ............... B64C 3/56 |
| WO | 2011/144298 A1 | 11/2011 | |

OTHER PUBLICATIONS

EP 15195101.9 Search Report dated Feb. 23, 2016.

*Primary Examiner* — Richard R. Green
*Assistant Examiner* — Steven J Shur
(74) *Attorney, Agent, or Firm* — Lerner, David, Littenberg, Krumholz & Mentlik, LLP

(57) ABSTRACT

A foldable wing for an aircraft includes a base wing having a base wing end region, a wing tip having a connection region, a first engagement means integrated into the base wing, a second engagement means integrated into the wing tip, and a drive mechanism coupled with the wing tip for moving the wing tip relative to the base wing. The first and second engagement means are adapted for engaging each other along a sliding course from a first position, in which the connection region of the wing tip and the base wing end region are in a flush contact to form a continuous wing, up to a second position, in which the first engagement means and the second engagement means disengage. The drive mechanism includes a first movement element and a second movement element at least partially extending in a spanwise direction, and supported in a linear guide each.

16 Claims, 6 Drawing Sheets

(56) References Cited

U.S. PATENT DOCUMENTS

| | | | |
|---|---|---|---|
| 8,476,564 B2* | 7/2013 | Henry | B64C 3/56 219/679 |
| 2003/0155463 A1 | 8/2003 | Cox et al. | |
| 2013/0056579 A1* | 3/2013 | Schlipf | B64C 3/56 244/49 |

* cited by examiner

FOLDABLE WING FOR AN AIRCRAFT AND AIRCRAFT HAVING A FOLDABLE WING

FIELD OF THE INVENTION

The invention relates to a foldable wing for an aircraft and an aircraft having a foldable wing.

BACKGROUND OF THE INVENTION

Foldable wing tip mechanisms are known for decades and allow to reduce the necessary storage volume for military aircraft operated on aircraft carriers. The application for commercial aircraft was developed in the 1990s, but has never been used in service.

In this technical field it is known to integrate a hinge into a wing to allow folding a wing tip or wing end from an operating position into an upright position. Such a hinge may substantially be aligned parallel to the direction of flight, i.e. parallel to the longitudinal axis of the aircraft. It is further known to provide a hinge axis perpendicular to the wing surface, i.e. in a substantially vertical direction, to allow the rotation of the wing tip in a backward direction. This allows to store a wing tip substantially parallel to the longitudinal axis of the aircraft. Furthermore, it is known to combine both to be able to achieve a vertical orientation of the wing tip chord in a final storage position, in which the wing tip extends substantially parallel to the fuselage, while the chord of the wing tip is substantially vertically arranged.

WO 2011144298 A1 shows a wing with a retractable wing end piece, wherein a mechanical lever system is used for executing a pivoting motion of a wing end piece comprising both a rotational component and a translational component. The lever kinematics comprises two lever arrangements, for which respective two hinged devices are provided.

BRIEF SUMMARY OF THE INVENTION

An aspect of the invention may provide a foldable wing for an aircraft with increased reliability and safety allowing the integration into a commercial aircraft, wherein a superior connection should be provided with a minimum possible effort.

A foldable wing for an aircraft is proposed, the wing comprising a base wing having a base wing end region, a wing tip having a connection region, a first engagement means integrated into the base wing, a second engagement means integrated into the wing tip, and a drive mechanism coupled with the wing tip for moving the wing tip relative to the base wing. The first engagement means and the second engagement means are adapted for engaging each other along a sliding course from a first position, in which the connection region of the wing tip and the base wing end region are in a flush contact to form a continuous wing, up to a second position, in which the first engagement means and the second engagement means disengage. The drive mechanism comprises a first movement element and a second movement element at least partially extending in a spanwise direction, wherein the first movement element and the second movement element are each supported in a linear guide, an outboard end of the first movement element being coupled with the wing tip in a first lateral position and an outboard end of the second movement element being coupled with the wing tip in a second lateral position. The drive mechanism is configured to move the first movement element and the second movement element at the same time to move the wing tip relative to the base wing at least along the sliding course between the first position and the second position.

The foldable wing according to an embodiment of the invention therefore consists of two major components, i.e. the base wing and the wing tip, which together form a continuous wing when the first and the second engagement means engage and when the wing tip is located in the first position. In this state of operation, the wing has the same aerodynamic and substantially the same mechanic characteristics as a common, non-foldable wing. After moving the wing tip from the first position beyond the second position, the wing may be folded to form a compact shape.

The design of the first engagement means and the second engagement means may arbitrarily be selected from numerous possible designs. However, it may be advantageous to design and dimension the first and second engagement means to conform with a common wing box design, such that the realization of a foldable wing according to an embodiment of the invention does not require a complete re-design of all major components of the wing. Both the base wing and the wing tip may be based on a common design consisting of at least one spar, a plurality of ribs attached to the at least one spar as well as an outer skin enclosing the at least one spar and the ribs. For example, a spar may be extended to protrude outside the respective component to constitute an engagement means.

A core aspect of the invention lies in providing a drive mechanism that allows to easily and reliably move the wing tip relative to the base wing with an adjustable course of motion through a mechanical control of the first movement element and the second movement element. Both at least partially extend in a spanwise direction from the base wing to the wing tip, such that a transfer of motion from the base wing to the wing tip is possible. The movement elements may comprise a longitudinal or planar shape. The outboard end of the movement elements is to be understood as an end with the greatest distance to the longitudinal axis of the aircraft, while the inboard end of the movement elements is the opposite thereto and is to be understood as an end with the least distance to the longitudinal axis of the aircraft.

The linear guides for guiding the two movement elements may be attached to an internal, structural component of the base wing and allow a free motion along a linear direction, which may substantially be a spanwise direction. For a smooth and reliable operation at different ambient temperatures and for reducing the required maintenance, the use of roller bearings suggests itself. Linear roller bearings provide high guidance and positioning accuracies even over long traverse distances. However, friction-type bearings may also be possible.

Due to coupling both movement elements with different lateral points on the wing tip, the motion of the wing tip is determined by the motion of the movement elements. If both are moved with the same velocity in a lateral, spanwise direction, the wing tip is moved along a linear course with a varying distance to the wing end region. Depending on the velocity difference the wing tip conducts a more or less distinctive rotary motion. For example, depending on the length and shape of the engagement means a substantially linear motion between the first position and the second position may be provided to safely disengage the engagement means. This is conducted by moving both movement elements with substantially the same velocity. Afterwards, i.e. beyond the second position, a more distinctive rotary motion may be conducted for folding the wing by moving both movement elements with distinctly different velocities.

By providing such a motion having substantially two different motion phases it is possible to decouple the process of securing the wing tip to the base wing from the motion into a stowage position without requiring two different dedicated drive mechanisms and particularly without a rotary drive at a dedicated hinge. However, depending on the actuating means couplable to the drive mechanism, the two motion phases may more or less merge into each other, thus limiting the possible designs of the engagement means.

In an exemplary embodiment, the drive mechanism is configured to move the first movement element and the second movement element with different velocities to rotate the wing tip relative to the base wing when the first engagement means and the second engagement means are disengaged. As explained above the motion of the wing tip is also determined by the difference in the velocities of the movement elements. The higher the difference between the velocities, the higher the degree of rotary motion in comparison with a purely linear motion. A complex arrangement for rotating the wing tip with a separate rotation mechanism is not necessary.

The drive mechanism may advantageously be adapted to rotate the wing tip around a hinge axis at the outboard end of the first movement element relative to the base wing when the first engagement means and the second engagement means are disengaged. Exemplarily, the hinge axis may be chosen to be parallel to the x-y-plane of the aircraft, such that by rotation of the wing tip around the hinge axis it swivels into an upward or downward direction. It is especially advantageous to align the hinge axis substantially parallel to the longitudinal axis of the aircraft, which allows to swivel the wing tip into a vertical position substantially parallel to the x-z-plane of the aircraft. The integration of the hinge axis into the outboard end of the first movement element simplifies the drive mechanism.

It is advantageous if the wing further comprises at least one sealing means attached to one of the base wing end region and the connection region of the wing tip, wherein the at least one sealing means is adapted to seal the base wing end region and the wing tip connection region in the first position. To avoid ingress of airflow and humidity into the base wing or the wing tip through a gap between the connection region of the wing tip and the base wing end region it is desired to provide a sufficient sealing. This substantially eliminates undesired contamination, abrasion, wear and noise generation. The at least one sealing means may be a single sealing means, two sealing means having corresponding shapes such that they may be brought into a flush surface contact, or a plurality of sealing means. The sealing means may be made of an elastomeric material, such as a silicone, which may additionally be textile reinforced. Further, the sealing means may advantageously be of a circumferential shape.

In another advantageous embodiment at least one of the base wing end region and the wing tip connection region comprises a funnel-shape. When moving the wing tip into the first position, a self-alignment between the base wing end region and the wing tip connection region results.

In a further advantageous embodiment, the base wing end region and the wing tip connection region are dimensioned such that in the first position a circumferential rim, groove or channel extends over an outer surface of the wing and encloses the base wing end region and the wing tip connection region, into which the at least one sealing means is placed. A circumferential sealing means may exemplarily comprise a P-bulb cross-section, wherein a leg of such a cross-section may be attached to one of the base wing end region and the wing tip connection region, while a bulb part extends into the rim, groove or channel. When the wing tip is in the first position the sealing means completes the base wing end region and the wing tip connection region to comprise a smooth surface.

At least one of the first movement element and the second movement element may comprise a plate shape, which may be supplemented by projections in edge regions to provide an increased structural stiffness to improve the load carrying characteristics of the movement elements. In particular when both movement elements comprise a plate shape, the movement elements may be designed to at least partially extend on or in each other, which may allow an integrated design of the linear guides to increase the compactness of the whole drive mechanism.

It is preferred that one of the first engagement means and the second engagement means comprises at least one longitudinal body, while the other one of the first engagement means and the second engagement means comprises at least one recess corresponding to said at least one longitudinal body. The longitudinal body may be an elongate element, which extends from either the connection region or the wing end region, while the recess with corresponding dimensions is located at the other one of the wing tip connection region or the base wing end region. When using a plurality of longitudinal bodies, they may also be distributed on both the wing tip and the base wing. When using such a longitudinal body as well as a correspondingly dimensioned recess, a sliding engagement may be accomplished by inserting the longitudinal body into the recess and moving the longitudinal body along the extension of the recess until the wing tip reaches the first position. In this position, depending on the length of the longitudinal body, an excellent transfer of bending moments is possible. Still further, the longitudinal body and/or the recess may be located directly adjacent to or may be integrated into at least one spar of a wing box in the base wing or a wing box in the wing tip. Hence, the combination of the motion along a sliding course as well as the use of at least one longitudinal body leads to an excellent result regarding structural integrity and reliability.

The cross-sectional profile of the longitudinal body may be of any suitable shape, which includes circular, oval, elliptic, rectangular or any other polygonal shape, wherein the longitudinal body may preferably be hollow, while a rigid construction may be possible with smaller dimensions of the longitudinal body.

In an exemplary embodiment, the at least one longitudinal body comprises a tip and a base, wherein the at least one longitudinal body tapers off from the base to the tip. A motion along the sliding course from the second position to the first position allows an insertion of the tip of the longitudinal body into the recess with a relatively low precision and a deviation from a purely linear motion, depending on the tapering degree. By advancing the longitudinal body further into the recess, the distance between the outer surface of the longitudinal body and the inner surface of the recess decreases more and more, which leads to a self-alignment of the longitudinal body in the recess. This self-alignment may be used independent of or in addition to the above-mentioned self-alignment using the sealing apparatus.

The at least one longitudinal body may be segmented by means of a folding joint, which extends out of the at least one recess in the second position and beyond. In this exemplary embodiment, the at least one longitudinal body remains inside the at least one recess in all positions of the wing tip between the first and second position. However, due to the integration of the folding joint into the at least one longitudinal body it is possible to swivel the wing tip around the folding joint when it reaches the second position or beyond. This may decrease the required positioning precision of the drive mechanism.

In an exemplary embodiment, at least one of the first engagement means, the second engagement means and a directly adjacent component may comprise at least one spigot, wherein the other of the at least one of the first engagement means, the second engagement means and a directly adjacent component may comprise at least one correspondingly shaped lug for receiving the at least one spigot. A spigot may be attached directly on the wing end region or the connection region of the wing tip. Alternatively or additionally, a spigot may also be attached to an above mentioned longitudinal body or another engagement means having a different shape.

Preferably, the drive mechanism is completely integrated into the base wing and the movement elements extend through the base wing end region to the wing tip. The base wing allows the operation and control of at least one actuator by connecting to an internal power source of the aircraft and a suitable control unit. The drive mechanism is connected or connectable to the at least one actuator for deploying movement elements.

Furthermore, the drive mechanism is couplable with a single rotary actuator through at least one lever attached to the rotary actuator and the drive mechanism. Advantageously, the at least one lever comprises a first articulation point attached to the rotary actuator, a second articulation point coupled with the inboard end of the first movement element and a third articulation point coupled with the inboard end of the second movement element. The second articulation point may comprise a smaller distance to the first articulation point than the third articulation point. The motion of the two movement elements are conducted with different velocities depending on the shape of the at least one lever and the momentary location of the second and third articulation points.

The first and second movement elements of the drive mechanism are also couplable with a swivably mounted lever, which in turn is coupled with a linear actuator. By moving the linear actuator, the lever provides a rotational motion and as a result moves the drive mechanism as described above.

In an alternative, the first and second movement elements are each couplable with an individual linear actuator, which increases the flexibility and controllability of the wing tip motion.

In a preferred embodiment the at least one lever is an L-shaped lever, wherein the third articulation point in a first position of the drive mechanism is in a location further inboard in comparison to the second articulation point. Exemplarily, the at least one lever may comprise a first leg carrying the first articulation point and the second articulation point, as well as a second leg carrying the second articulation point and the third articulation point, wherein the first leg and the second leg enclose an angle of at least 45 degrees. Depending on the orientation of the at least one lever in the first position of the drive mechanism, the first movement element and the second movement element conduct a substantially linear motion between the first and second position of the drive mechanism.

It is preferred to align the linear guides parallel to each other. In particular, it is considered useful to align the linear guides as close to load carrying structures as possible, such as front or rear spars. In common aircraft, front spars may be arranged in a spanwise direction approximately along a ¼ chord line, while rear spars may be arranged along a ¾ chord line. However, this may be different in modern commercial aircraft with composite structures and the mentioned chord lines should not be construed as limitations.

The invention also relates to an aircraft having a foldable wing according to the above.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1A:
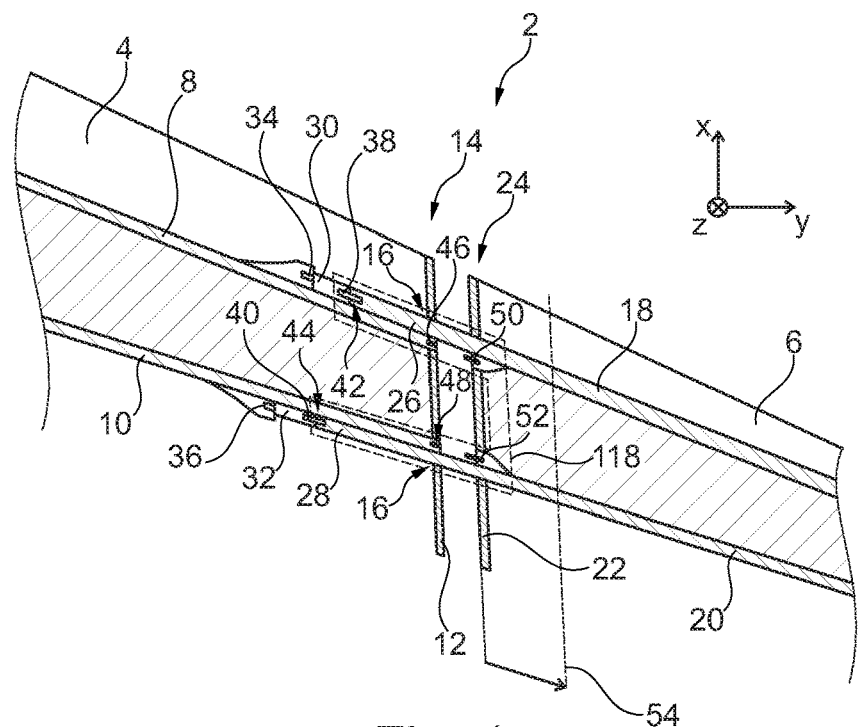
FIG. 1a shows a first exemplary embodiment of a foldable wing, focusing on an exemplary location and design of the engagement means.

FIG. 1a shows an exemplary and simplified embodiment of a foldable wing 2 having a base wing 4 and a wing tip 6. The base wing 4 comprises a front spar 8, a rear spar 10 and a plurality of ribs, wherein only a first rib 12 located at a base wing end region 14 is shown. The first rib 12 comprises openings 16, which are accessible from outside the base wing 4 and into which recesses 30 and 32 extend. These are considered "first engagement means" according to the above description.

The wing tip 6 comprises a similar design. Here, a front spar 18 and a rear spar 20 together with ribs provide a main structure, wherein only a second rib 22 is shown, which is located in a wing tip connection region 24. The front spar 18 and the rear spar 20 extend outside the wing tip 6 and protrude over the second rib 22. This leads to the creation of a first longitudinal body 26 and a second longitudinal body 28, which are both considered "second engagement means" according to the above description. Both second engagement means, i.e. longitudinal bodies 26 and 28, reach through the openings 16 into the correspondingly formed recesses 30 and 32, which are located directly adjacent to the front spar 8 and the rear spar 10 of the base wing 4. Exemplarily, the forward recess 30 is located forward the front spar 8 and the rear recess 32 is located behind the rear spar 10. However, the recesses 30 and 32 may also be integrated into the spars 8 and 10, if their design allows this.

In FIG. 1a, the first rib 12 and the second rib 22 are exemplarily arranged at a distance to each other. However, this illustration shows the wing 2 in the process of being folded or unfolded and is merely for providing a better understanding of the design of the foldable wing 2. For using the foldable wing 2 in flight, the second rib 22 should be in a substantially flush surface contact with the first rib 12. This position is considered a "first position" according to the above description. If the first rib 12 and the second rib 22 are not to be arranged directly at the base wing end region 14 or a wing tip connection region 24, the skin that envelopes the structures of the base wing 4 and the wing top 6 should contact each other in a flush manner in the first position. Here, the longitudinal bodies 26 and 28 are partially inserted into the recesses 30 and 32. Inter alia, the length of the longitudinal elements 26 and 28 determines the capability for transferring bending moments between the wing tip 6 and the base wing 4.

For further improving the connection of the wing tip 6 and the base wing 4 in the first position, a first inboard lug 34 and a second inboard lug 36 are arranged at the end of the recesses 30 and 32, respectively. These correspond to inboard spigots 38 and 40 arranged at tips 42 and 44 of each of the longitudinal bodies 26 and 28, which engage with the inboard lugs 34 and 36 just in front of and in the first position. Further, outboard lugs 46 and 48 may be arranged in the wing end region 14 in front of the rear spar 20 and behind the front spar 18 of the base wing 4, respectively. These correspond to outboard spigots 50 and 52, arranged in the connection region 24 of the wing tip 6 directly adjacent to the front spar 18 and the rear spar 20. Hence, when sliding the wing tip 6 onto the base wing 4, in the first position four lug-spigot-connections are created in addition to the connection between the longitudinal bodies 26 and 28 and the recesses 30 and 32.

Figure 3:
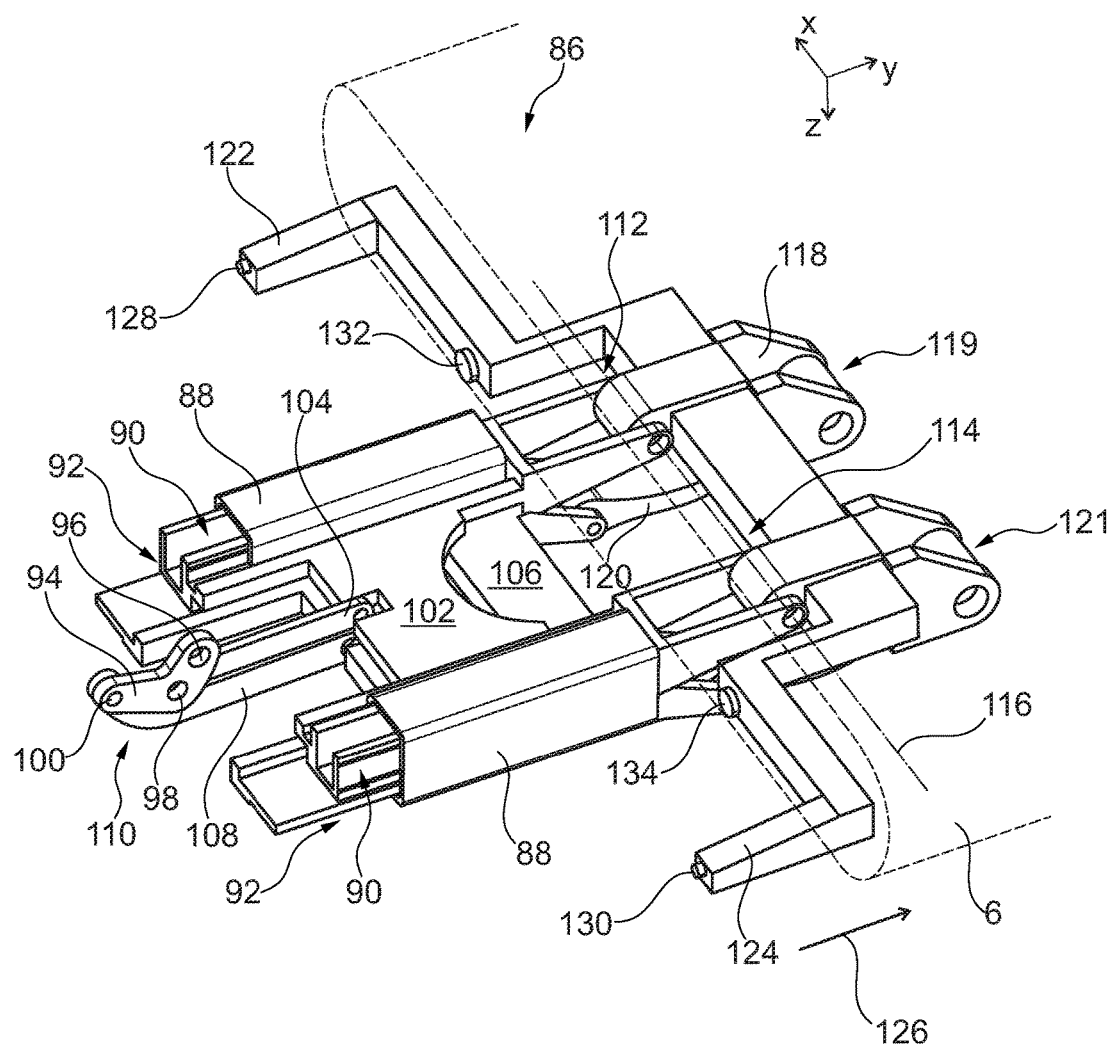
FIG. 3 illustrates an exemplary embodiment of a drive mechanism.

When moving the wing tip 6 to a second position 54, the longitudinal bodies 26 and 28 leave the recesses 30 and 32 in the base wing 4, leading to their disengagement. In the second position 54 or beyond it is thus possible to rotate wing tip 6 around a hinge axis, which may be parallel to the direction of flight, e.g. parallel to the extensions of the first rib 12 and the second rib 22. As indicated by dashed lines, a part of the wing tip 6 may consist of a frame 118, to which the remaining part of the wing tip 6 is attached to. An exemplary embodiment of such a frame 118 is shown in FIGS. 3 to 4d.

Figure 1B:
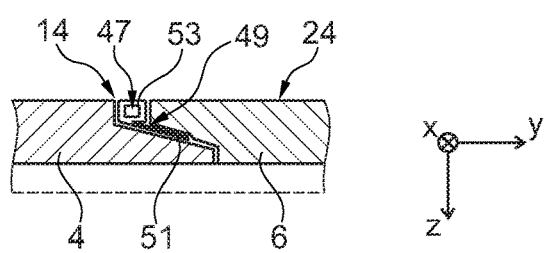
FIG. 1b shows a sealing means between the base wing end and the wing tip.

FIG. 1b shows a sectional view of an outer skin of the base wing 4 and the wing tip 6 with both components being in the first position. A radial outward surface of the skin of the base wing in the base wing end region 14 is sloped into a radial inward direction, such that the thickness of the skin decreases in a spanwise direction. The thickness of the skin of the wing tip 6 increases in an outboard direction so as to correspond with the slope of the base wing 4. Both the base wing end region 14 and the wing tip connection region 24 are designed to create a groove 49 facing in a radial outward direction, when the base wing 4 and the wing tip 6 are in a first position.

A sealing means 47 is in the groove 49 and exemplarily comprises a P-bulb cross-section. A leg 51 of the sealing means 47 may be attached to the base wing end region 14, while a bulb portion 53 fills the groove 49 to create a smooth outer surface.

Besides providing an improved seat for the sealing means 47, the sloped portions of the base wing end region 14 and the wing tip connection region 24 provide a self-alignment of the base wing end region 14 and the wing tip connection region 24.

Figure 2:
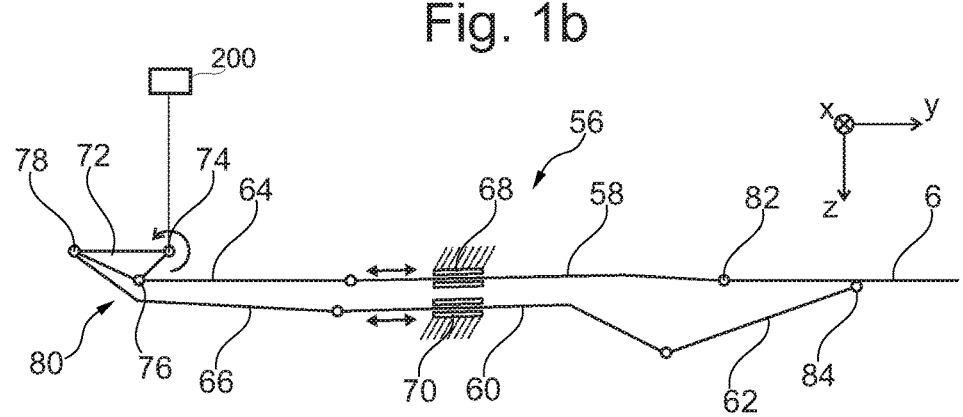
FIG. 2 shows a simplified schematic diagram of a drive mechanism in an exemplary embodiment.

Moving the wing tip is accomplished by a drive mechanism integrated into the base wing 4. FIG. 2 shows an exemplary illustration of a drive mechanism 56 for moving the wing tip 6. As previously explained, the wing tip 6 should conduct a first motion phase along a sliding course to engage or disengage the longitudinal bodies 26 and 28 with or from the recesses 30 and 32. Hence, the drive mechanism 56 should be able to conduct a mainly linear motion. For the rotation, the drive mechanism 56 should further conduct a mainly rotary motion. This is accomplished by a certain kinematical design.

The drive mechanism 56 comprises a first movement element 58, a second movement element 60, a drive strut 62 as well as a first link 64 and a second link 66. The first link 64 is swivably coupled with the first movement element 58, which in turn is slidably supported in a first linear guide 68 fixedly mounted in the base wing 4. Hence, by moving the first linkage 64, the first movement element 58 slides in the first linear guide 68. In analogy to this, the second linkage 66 is swivably coupled with the second movement element 60, which in turn is slidably supported in a second linear guide 70 fixedly mounted in the base wing 4. By moving the second linkage 66, the second movement element 60 may slide along the second linear guide 70.

Both linkages 64 and 66 are coupled with a two-lever drive 72, which comprises three articulation points 74, 76 and 78. The first articulation point 74 is exemplarily connected to a rotary actuator 200. The second articulation point 76 is coupled with the first linkage 64, while the third articulation point 78, which comprises a distinctly greater distance to the first articulation point 74 than the second articulation point 76, is coupled with the second linkage 66. For avoiding collisions between the first linkage 64 and the second linkage 66, the second linkage 66 comprises a kink 80, but this depends on the actual design of the two-lever drive.

By rotating the two-lever drive 72 around the first articulation point 74, the second and third articulation point 76 and 78 move on a circular path and drive the first rod 58 and the second rod 60 through the linkages 64 and 66. The two-lever drive 72 is designed such that a substantially linear motion of a hinge point 82 (and hinge axis, respectively) at an outboard end of the first movement element 58, around which the wing tip 6 is swivably supported, as well as hinge point 84, which is coupled with the wing tip 6 at a distance to the hinge point 82 (and hinge axis, respectively) through drive strut 62, conducts a mainly linear motion. This is accomplished by providing mainly the same travel velocities with the first movement element 58 and the second movement element 60. When reaching a certain state of the two-lever drive 72, which corresponds to the second position 54 shown in FIG. 1, the travel velocities of the first movement element 58 and second movement element 60 start to differ from each other more clearly, such that a rotation of the wing tip 6 attached to the hinge points 82 and 84 is brought about.

It is clear that the dimensions of the drive mechanism 56 are not necessarily to scale. The individual layout heavily depends on the actual design of the wing tip 6 as well as the longitudinal bodies 26 and 28.

FIG. 3 shows a drive mechanism 86 in more detail, but according to the working principle shown in FIG. 2. First of all, two linear guides 88 are shown, which carry a guide portion 90 of a first moving element 102 and a guide portion 92 of a second moving element 106, which are exemplarily realized in a space-efficient, compact and integrated setup, in which they partially enclose each other.

A two-lever drive 94 comprises a first articulation point 96, a second articulation 98 and a third articulation point 100. The first articulation point 96 is attachable to a rotary actuator, which is not shown in FIG. 3. The second articulation point 98 is coupled with the first moving element 102 through a linkage 104, which is swivably mounted on the second articulation point 98 as well as to the first movement element 102. The third articulation point 100, which comprises a much greater distance to the first articulation point 96 than the second articulation point 98, is coupled with the second moving element 106 over a second linkage 108. Again, the second linkage 108 is swivably mounted on the third articulation point 100 as well as on the second movement element 106. For avoiding a collision with the first linkage 104, the second linkage 108 comprises a kink 110.

The first movement element 102 holds a set of hinges 112 and 114, which provide a hinge axis 116, around which the wing tip (not shown) is rotatable. The second movement element 106 is coupled with a frame 118 through a drive strut 120, which is swivably mounted on the second movement element 106 and the frame 118 at another set of hinges 119 and 121 arranged at the frame 118, which are equivalent to the hinge point 84 in FIG. 2. The frame 118 in turn is swivably mounted on the set of hinges 112 and 114 and is adapted to carry or be an integral part of the wing tip 6. Hence, the set of hinges 119 and 121 may also be an integral part of the wing tip. For providing a rigid connection to the base wing 4, the frame 118 (and the wing tip, respectively) comprises two longitudinal bodies 122 and 124 as second engagement means, which are insertable into correspondingly shaped recesses of the base wing 4 (not shown).

As explained regarding FIG. 2, by rotating the two-lever drive 94 about the first articulation point 96, the first movement element 102 and the second movement element 106 basically move at the same velocity, such that the frame 118 is driven along a sliding course 126. After a certain degree of rotation of the two-lever drive 94, the second movement element 106 travels at a distinctly greater velocity than the first movement element 102 and pushes the second point of the wing tip faster than the hinges 112, 114. Consequently, the frame 118 rotates about the hinge axis 116. As a result, the wing tip 6 is swiveled upward.

As mentioned regarding FIG. 1, the longitudinal bodies 122 and 124 may comprise additional spigots 128 and 130 to improve the positioning precision of the frame 118 in the first position. Additionally, the frame 118 may even comprise further spigots 132 and 134 at more inward directions.

Altogether, the drive mechanism 86, which is fully integratable into the base wing 4, may be realized in a simple, reliable and safe fashion and relies on proven and established design principles of e.g. high lift systems and other control surfaces of an aircraft.

Figure 4A:
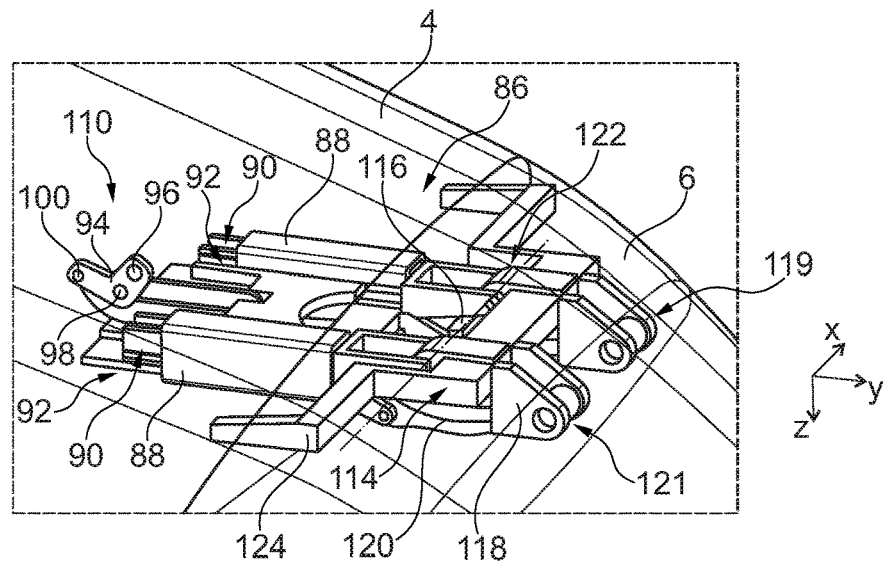
FIGS. 4a to 4d demonstrate the integration of a drive mechanism into a foldable wing.
Figure 4B:
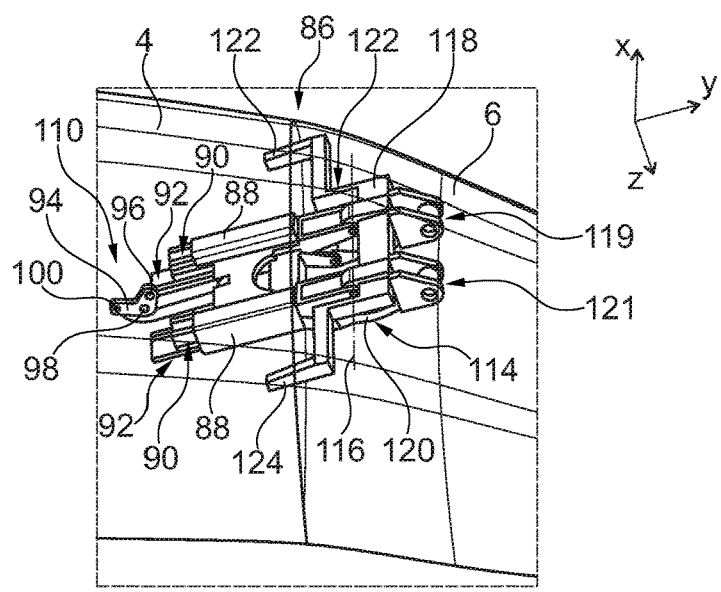
Figure 4C:
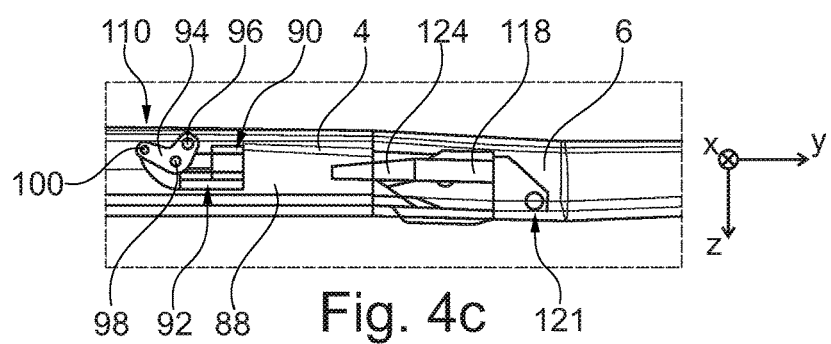
Figure 4D:
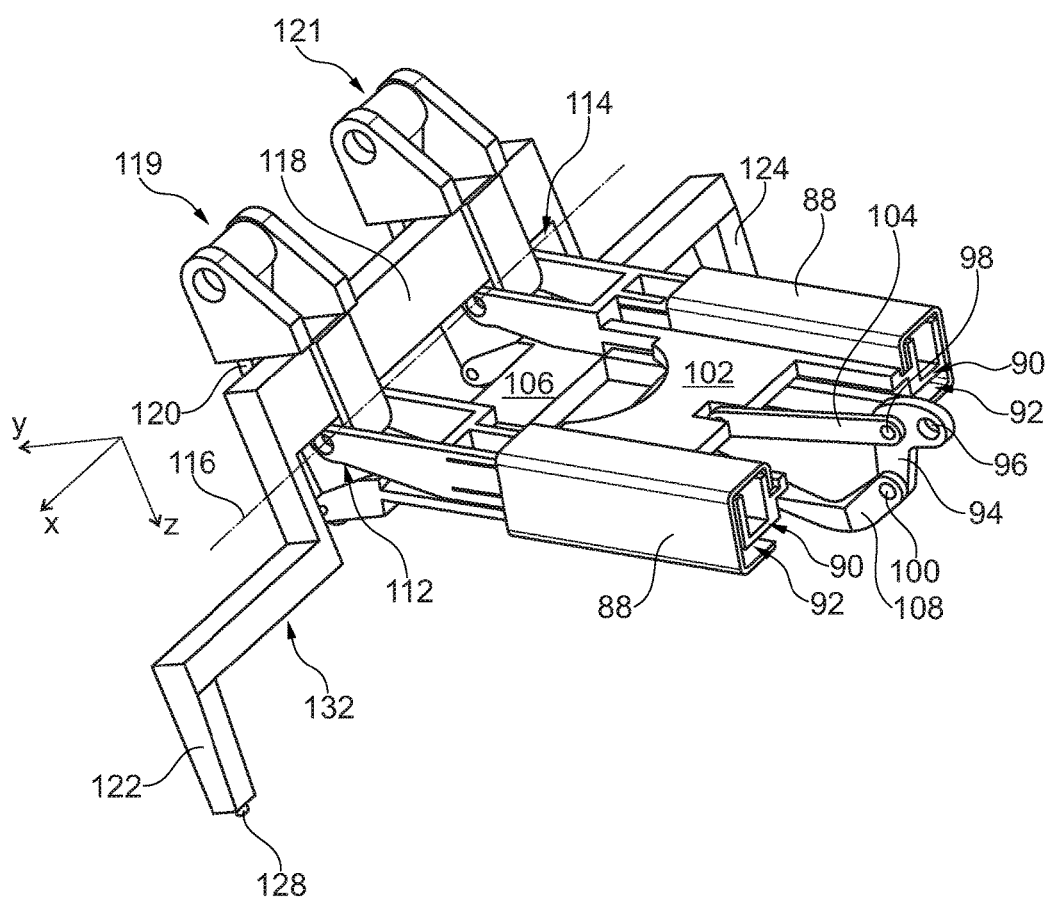

To improve the understanding of the integration of the drive mechanism 86 into a wing, FIGS. 4a, 4b and 4c show a base wing 4, a wing tip 6 as well as the drive mechanism 86 of FIG. 3 in three different views. FIG. 4a is an isometric view onto a section covering the base wing, the wing tip and the drive mechanism 86, while FIG. 4b shows a top view and FIG. 4c a front view. Here, the frame 118 is in its first position, such that the longitudinal bodies 122 and 124 are fully inserted into respective recesses (not shown).

FIG. 4d shows the drive mechanism 86 beyond a second position, in which the longitudinal elements 122 and 124 are moved out of the associated recesses (not shown), to allow the frame 118 to achieve a distinctly rotated position. In this illustration, the frame 118 is almost perpendicular to the movement elements 102 and 106.

Figure 5A:
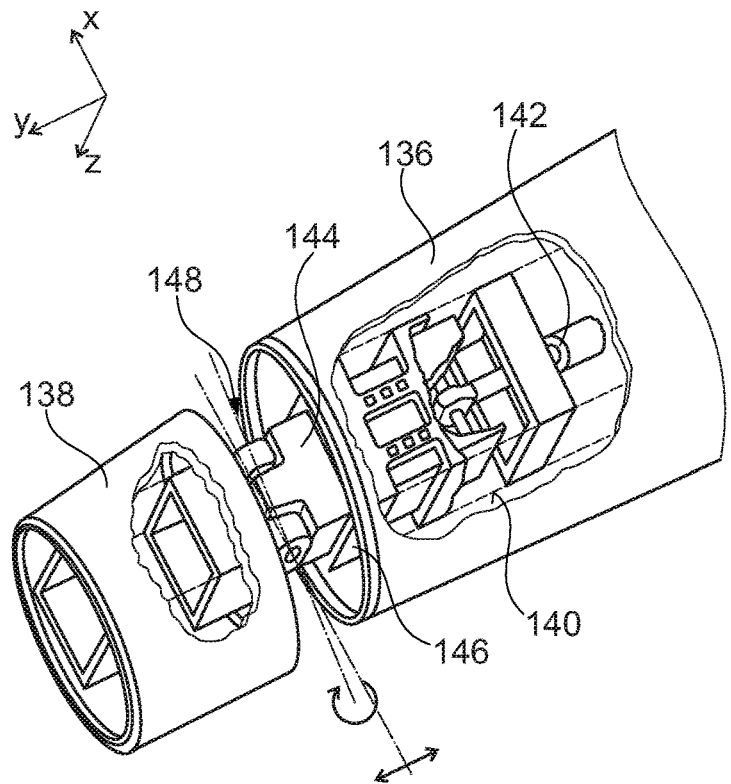
FIGS. 5a and 5b show another exemplary embodiment of a foldable wing.
Figure 5B:
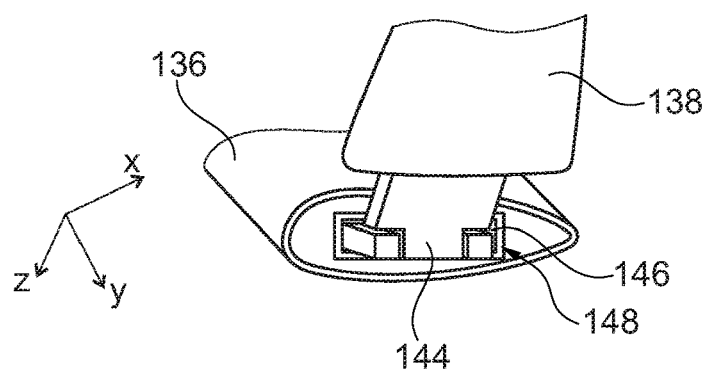

FIGS. 5a and 5b show a different exemplary embodiment. Here, a base wing 136 and a wing tip 138 are shown in two different positions. A drive mechanism 140 integrated into the base wing 136 is coupled with an actuating means 142 and acts onto a longitudinal body 144 as a second engagement means, which runs in a recess 146 as a first engagement means in the base wing 136 and comprises a folding joint 148, around which the wing tip 138 is rotatable. The longitudinal body 144 may be a part of or connected to a spar of the wing tip 138, such that when the folding joint 148 is fully positioned inside the base wing 136, the wing tip 138 is rigidly connected to the base wing 136.

The drive mechanism may be accomplished by the same setup as shown in the previous figures. An advantage of this exemplary embodiment is the less stringent requirement of positioning accuracy, as the longitudinal body 144 never leaves the recess 146, such that the wing end 138 is always guided in its motion independent of the positioning accuracy of the drive mechanism 140. It suggests itself to further provide a sealing means as shown in FIG. 1a.

Figure 6:
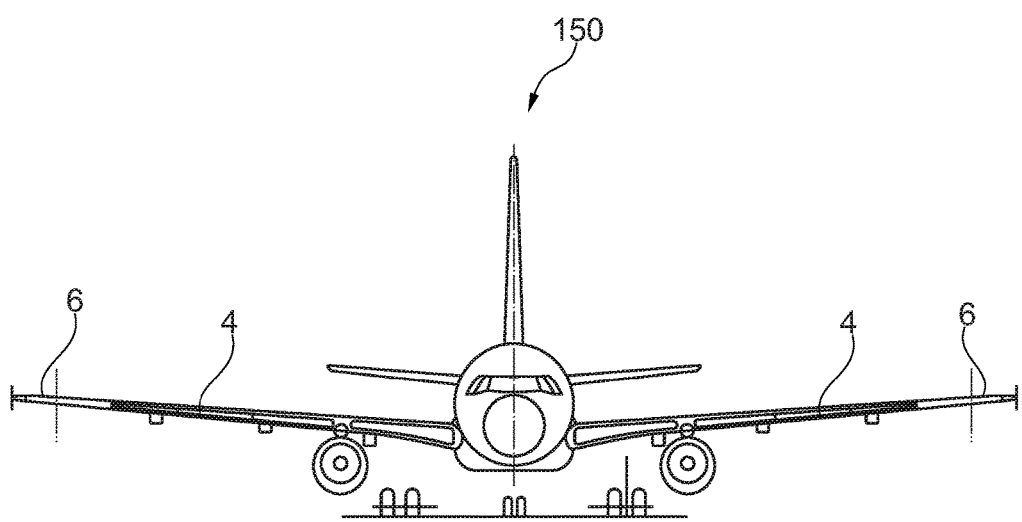
FIG. 6 shows an aircraft having a foldable wing.

FIG. 6 shows a front view of an exemplary aircraft 150 having foldable wings consisting of a base wing 4 and a wing tip 6 each.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A foldable wing for an aircraft, comprising:
 a base wing having a base wing end region;
 a wing tip having a connection region;
 a first engagement means integrated into the base wing;
 a second engagement means integrated into the wing tip; and
 a drive mechanism coupled with the wing tip for moving the wing tip relative to the base wing,
 wherein the first engagement means and the second engagement means are adapted for engaging each other along a sliding course from a first position, in which the connection region of the wing tip and the base wing end region are in a flush contact to form a continuous wing, up to a second position, in which the first engagement means and the second engagement means disengage,
 wherein the drive mechanism comprises a first movement element and a second movement element at least partially extending in a spanwise direction, wherein the first movement element and the second movement element are supported in a first linear guide and a second linear guide, respectively, an outboard end of the first movement element being coupled with the wing tip in a first lateral position and an outboard end of the second movement element being coupled with the wing tip in a second lateral position, wherein the drive mechanism is configured to move the first movement element and the second movement element at the same time to move the wing tip relative to the base wing at least along the sliding course between the first position and the second position, and wherein the first and second linear guides are aligned parallel to one another such that the first and second movement elements are supported parallel to one another.

2. The wing according to claim 1, wherein the drive mechanism is configured to move the first movement element and the second movement element with different velocities to rotate the wing tip relative to the base wing when the first engagement means and the second engagement means are disengaged.

3. The wing according to claim 1, wherein the drive mechanism is adapted to rotate the wing tip around a hinge axis at the outboard end of the first movement element relative to the base wing when the first engagement means and the second engagement means are disengaged.

4. The wing according to claim 1, further comprising:
at least one sealing means attached to one of the base wing end region and the connection region of the wing tip, wherein the at least one sealing means is adapted to seal the base wing end region and the wing tip connection region in the first position.

5. The wing according to claim 1, wherein at least one of the first movement element and the second movement element comprises a plate shape.

6. The wing according to claim 5, wherein the first movement element and the second movement element are configured to at least partially extend on or in each other.

7. The wing according to claim 1, wherein one of the first engagement means and the second engagement means comprises at least one longitudinal body, while the other one of the first engagement means and the second engagement means comprises at least one recess corresponding to the at least one longitudinal body.

8. The wing according to claim 7, wherein the at least one longitudinal body comprises a tip and a base, wherein the at least one longitudinal body tapers off from the base to the tip.

9. The wing according to claim 7, wherein the at least one longitudinal body is segmented by means of a folding joint, which extends out of the at least one recess in the second position and positions further away relative to the first position.

10. The wing according to claim 1,
wherein at least one of the first engagement means, the second engagement means and a directly adjacent component comprises at least one spigot, and
wherein the other of the at least one of the first engagement means, the second engagement means and the directly adjacent component comprises at least one correspondingly shaped lug for receiving the at least one spigot.

11. The wing according to claim 1, wherein the drive mechanism is completely integrated into the base wing and the first movement element and second movement element extend through the base wing end region to the wing tip.

12. The wing according to claim 1, wherein the drive mechanism is coupled with a single rotary actuator through at least one lever attached to the rotary actuator and the drive mechanism.

13. The wing according to claim 1, wherein the drive mechanism is coupled with at least one longitudinal actuator.

14. The wing according to claim 1, wherein the drive mechanism further comprises a two-lever drive comprising a first articulation point configured to be attached to a rotary actuator, a second articulation point coupled with the first movement element and a third articulation point coupled with the second movement element.

15. An aircraft having a foldable wing comprising:
a base wing having a base wing end region;
a wing tip having a connection region;
a first engagement means integrated into the base wing;
a second engagement means integrated into the wing tip; and
a drive mechanism coupled with the wing tip for moving the wing tip relative to the base wing,
wherein the first engagement means and the second engagement means are adapted for engaging each other along a sliding course from a first position, in which the connection region of the wing tip and the base wing end region are in a flush contact to form a continuous wing, up to a second position, in which the first engagement means and the second engagement means disengage,
wherein the drive mechanism comprises a first movement element and a second movement element at least partially extending in a spanwise direction, wherein the first movement element and the second movement element are supported in a first linear guide and a second linear guide, respectively, an outboard end of the first movement element being coupled with the wing tip in a first lateral position and an outboard end of the second movement element being coupled with the wing tip in a second lateral position, and
wherein the drive mechanism is configured to move the first movement element and the second movement element at the same time to move the wing tip relative to the base wing at least along the sliding course between the first position and the second position, and
wherein the first and second linear guides are aligned parallel to one another such that the first and second movement elements are supported parallel to one another.

16. The aircraft according to claim 15, wherein the drive mechanism further comprises a two-lever drive comprising a first articulation point configured to be attached to a rotary actuator, a second articulation point coupled with the first movement element and a third articulation point coupled with the second movement element.

* * * * *